(12) United States Patent
Menahem et al.

(10) Patent No.: US 10,600,002 B2
(45) Date of Patent: Mar. 24, 2020

(54) MACHINE LEARNING TECHNIQUES FOR PROVIDING ENRICHED ROOT CAUSES BASED ON MACHINE-GENERATED DATA

(71) Applicant: Loom Systems LTD., Tel Aviv (IL)

(72) Inventors: Gabby Menahem, Petach Tikva (IL); Dror Mann, Tel Aviv (IL); Yaron Lehmann, Tel Aviv (IL)

(73) Assignee: LOOM SYSTEMS LTD., Tel Aviv (IL)

( * ) Notice: Subject to any disclaimer, the term of this patent is extended or adjusted under 35 U.S.C. 154(b) by 181 days.

(21) Appl. No.: 15/785,863

(22) Filed: Oct. 17, 2017

(65) Prior Publication Data
US 2018/0039914 A1 Feb. 8, 2018

Related U.S. Application Data

(63) Continuation-in-part of application No. 15/499,060, filed on Apr. 27, 2017, which is a continuation-in-part of application No. 15/228,272, filed on Aug. 4, 2016.

(51) Int. Cl.
*G06F 11/00* (2006.01)
*G06N 20/00* (2019.01)
*G06N 5/04* (2006.01)
*G06Q 10/00* (2012.01)
(Continued)

(52) U.S. Cl.
CPC ......... *G06N 20/00* (2019.01); *G06F 11/3452* (2013.01); *G06N 5/048* (2013.01); *G06Q 10/20* (2013.01); *G06Q 30/01* (2013.01)

(58) Field of Classification Search
CPC ........................ G06F 11/079; G06F 11/0769
See application file for complete search history.

(56) References Cited

U.S. PATENT DOCUMENTS 5,787,234 A * 7/1998 Molloy ................. G06F 16/334
706/46
6,367,034 B1 4/2002 Novik et al.
7,076,543 B1 7/2006 Kirti et al.
(Continued)

OTHER PUBLICATIONS

No stated author; Symantec TM Control Compliance Suite 11.0 User Guide; 2012; Retrieved from the Internet : https://www.scribed.com/document/126556709/CCS-User-Guide>; pp. 1-952, as printed. (Year: 2012).
(Continued)

*Primary Examiner* — Christopher S McCarthy
(74) *Attorney, Agent, or Firm* — M&B IP Analysts, LLC (57) ABSTRACT

A method and system for providing an enriched root cause of an incident using machine-generated textual data. The method includes extracting, from a dataset including machine-generated textual data for a monitored environment, a plurality of features related to a root cause of an incident in the monitored environment; generating a suitability score for each of a plurality of insights with respect to the incident based on the extracted features and a suitability model, wherein the suitability model is created based on a training set including a plurality of training inputs and a plurality of training outputs, wherein each training output corresponds to at least one of the plurality of training inputs; and selecting at least one suitable insight based on the generated suitability scores.

17 Claims, 8 Drawing Sheets (51) Int. Cl.
*G06Q 30/00* (2012.01)
*G06F 11/34* (2006.01)

(56) References Cited

U.S. PATENT DOCUMENTS

| | | | |
|---|---|---|---|
| 8,447,722 B1 | 5/2013 | Ahuja et al. | |
| 9,037,896 B2 | 5/2015 | Addepalli et al. | |
| 9,043,332 B2 | 5/2015 | Noel et al. | |
| 9,294,631 B1 | 3/2016 | Cogan et al. | |
| 9,972,103 B2 | 5/2018 | Alves et al. | |
| 9,992,220 B2 | 6/2018 | Coates et al. | |
| 9,996,409 B2 | 6/2018 | Chen et al. | |
| 10,007,717 B2 | 6/2018 | Zhang et al. | |
| 10,015,185 B1 | 7/2018 | Kolman et al. | |
| 10,021,127 B2 | 7/2018 | DiValentin et al. | |
| 10,021,138 B2 | 7/2018 | Gill et al. | |
| 10,037,238 B2 | 7/2018 | Bikumala | |
| 10,043,006 B2 | 8/2018 | Puri et al. | |
| 10,050,917 B2 | 8/2018 | Alperovitch et al. | |
| 10,051,010 B2 | 8/2018 | Carver et al. | |
| 10,055,477 B2 | 8/2018 | Nojima | |
| 10,057,285 B2 | 8/2018 | Choudhary et al. | |
| 10,061,805 B2 | 8/2018 | Tidwell et al. | |
| 10,063,570 B2 | 8/2018 | Muddu et al. | |
| 10,102,054 B2 | 10/2018 | Wolf et al. | |
| 10,169,122 B2 | 1/2019 | Tee et al. | |
| 10,311,067 B2 * | 6/2019 | Chen | G06F 16/24578 |
| 2003/0004966 A1 | 1/2003 | Bolle et al. | |
| 2003/0149586 A1 | 8/2003 | Chen et al. | |
| 2005/0060295 A1 | 3/2005 | Gould et al. | |
| 2005/0080806 A1 | 4/2005 | Doganata et al. | |
| 2006/0095521 A1 | 5/2006 | Patinkin | |
| 2007/0214164 A1 | 9/2007 | MacLennan et al. | |
| 2007/0220063 A1 | 9/2007 | O'Farrell et al. | |
| 2010/0017487 A1 | 1/2010 | Patinkin | |
| 2010/0057677 A1 * | 3/2010 | Rapp | G06F 11/0709 707/E17.014 |
| 2010/0125911 A1 | 5/2010 | Bhaskaran | |
| 2010/0312522 A1 | 12/2010 | Laberge et al. | |
| 2010/0312769 A1 | 12/2010 | Bailey et al. | |
| 2012/0062574 A1 | 3/2012 | Dhoolia et al. | |
| 2012/0150859 A1 | 6/2012 | Hu | |
| 2012/0197896 A1 | 8/2012 | Li et al. | |
| 2013/0097701 A1 | 4/2013 | Moyle et al. | |
| 2013/0262656 A1 | 10/2013 | Cao et al. | |
| 2013/0268839 A1 | 10/2013 | Lefebvre et al. | |
| 2013/0311481 A1 | 11/2013 | Bhatt et al. | |
| 2014/0095425 A1 | 4/2014 | Sipple | |
| 2014/0129536 A1 | 5/2014 | Anand et al. | |
| 2014/0324862 A1 | 10/2014 | Bingham et al. | |
| 2015/0278823 A1 | 10/2015 | Kushnir et al. | |
| 2015/0370799 A1 | 12/2015 | Kushmerick et al. | |
| 2016/0034525 A1 | 2/2016 | Neels et al. | |
| 2016/0065594 A1 | 3/2016 | Srivastava et al. | |
| 2017/0063896 A1 | 3/2017 | Muddu et al. | |
| 2017/0075744 A1 * | 3/2017 | Deshpande | G06F 11/079 |
| 2017/0272458 A1 | 9/2017 | Muddu et al. | |
| 2018/0115464 A1 | 4/2018 | Fighel | |
| 2018/0146000 A1 | 5/2018 | Muddu et al. | |
| 2018/0157762 A1 | 6/2018 | Tee | |
| 2018/0159880 A1 | 6/2018 | Sood et al. | |
| 2018/0159885 A1 | 6/2018 | Baum et al. | |
| 2018/0173769 A1 | 6/2018 | Saperstein et al. | |
| 2018/0191754 A1 | 7/2018 | Higbee et al. | |

OTHER PUBLICATIONS

Symantec: Control Compliance Suite 11.0 User Guide; 2012; pp. 1-952.
Introduction to ARIMA models, url: http://people.duke.edu/~mau/411arim.htm.
Wikipedia definition for Grubbs' Test, Retrieved from "https://en.wikipedia.org/w/index.php?title=Grubbs%27_test_for_outliers&oldid=720201233", page last edited May 14, 2016.
Wikipedia definition of AdaBoost, Retrieved from "https://en.wikipedia.org/w/index.php?title=AdaBoost&oldid=768996379", page last edited Mar. 6, 2017.
Wikipedia definition of Fournier transform, Retrieved from "https://en.wikipedia.org/w/index.php?title=Fourier_transform&oldid=778201678", Page last edited on May 1, 2017.
Wikipedia definition of Hidden Markov model, Retrieved from "https://en.wikipedia.org/w/index.php?title=Hidden_Markov_model&oldid=778214092", page last edited on May 1, 2017.
Wikipedia definition of Kolmogorov-Smirnov test, Retrieved from "https://en.wikipedia.org/w/index.php?title=Kolmogorov-Smirnov_test&oldid=776209221", Page last edited on Apr. 19, 2017.
Wikipedia definition of Mann-Whitney U test, Retrieved from "https://en.wikipedia.org/w/index.php?title=Mann-Whitney_U_test&oldid=778009689", Page last edited on Apr. 30, 2017.
Bitincka, et al., "Optimizing Data Analysis with a Semi-structured Time Series Database", 2010, pp. 1-9, url: https://www.usenix.org/legacy/event/slaml10/tech/full_papers/Bitincka.pdf.
Carasso, "Exploring Splunk", 2012, pp. 1-156, url: https://www.splunk.com/pdfs/exploring-splunk.pdf.

* cited by examiner

MACHINE LEARNING TECHNIQUES FOR PROVIDING ENRICHED ROOT CAUSES BASED ON MACHINE-GENERATED DATA

CROSS-REFERENCE TO RELATED APPLICATIONS

This application is a continuation-in-part of U.S. patent application Ser. No. 15/499,060 filed on Apr. 27, 2017, which is a continuation-in-part of U.S. patent application Ser. No. 15/228,272 filed on Aug. 4, 2016. The contents of the above-noted applications are hereby incorporated by reference.

TECHNICAL FIELD

The present disclosure generally relates to root cause analysis of incidences using machine-generated data, and more particularly to providing descriptive enrichments to root causes using machine learning.

BACKGROUND

The amount of data generated by various machines (e.g., appliances, servers, software tools, etc.) connected in an organization is enormous. The machine-generated data may be in a structured textual format, an unstructured textual format, or a combination thereof. Examples for such machine-generated textual data include logs, metrics, configuration files, messages, spreadsheets, events, alerts, sensory signals, audit records, database tables, and so on.

The vast amount of machine-generated textual data requires information technology (IT) personnel to effectively review, analyze and respond to countless unwanted emails, messages, notifications, alerts, tickets, and the like to identify a specific malfunction. The ability of a person (e.g., an IT administrator) to react to such high volumes of data is limited by the rate of processing, skills, and experience of the person. Further, responding to malfunction incidences requires knowledge of not only the type of malfunction, but a type of response that is suitable for resolving the incident. For simple, frequent problems, it may be possible to build a "playbook" for responding to incidences. However, such playbooks will have countless numbers of escalation directives, which may occur frequently. As a result, this response determination by a human operator becomes impossible since the number of combinations of machines, types of malfunctions, and appropriate responses increases exponentially as the number of machines and complexity of those machines increase.

More specifically, human operators face several significant challenges that prevent them from effectively identifying and addressing incidences. First, a problem is often reported with respect to an open-ended problem that may be the result of a long, branching series of events. For example, a user report indicating that the user interface of an application is unusually slow may have multiple branching potential causes. Second, problems are often indicated by metrics (e.g., CPU, RAM, disk, network, etc.) that provide poor information regarding the problem itself. Third, the point at which a human operator may start investigating an incident is often far removed from the root cause such that determining the root cause is practically impossible. Due to these and other challenges, playbooks for solving incidences usually focus on gathering data and improving the starting point of the investigation, rather than solving the problem that caused the incident.

As an example, when a human operator reviews a ticket stating that the "workstation takes very long to log in," that text provides little context as to the cause of the slow login. Although the human operator may have access to a knowledge management system, he likely does not know which information to request in order to find a past incident that would have a relevant resolution. As another example, when the human operator investigates an incident that is rich with information (e.g., if the incident results in 20 different anomalies, with some anomalies occurring in a database and others occurring in webservers), the incident may be too complex for the human operator to parse through, let alone to allow for sufficiently fast responses.

Moreover, a user that needs to process such large volumes of data may wish to gain visibility as to the performance of the entire IT systems in the enterprises and determine a root cause for reported malfunction. To determine the causality between reported alerts, data received from different domains (e.g., network, infrastructure, and application) should be processed. Each such domain has its own domain-expert. Thus, the challenge of determining the root cause of each incident is amplified. For example, the machine-generated textual data may include readings indicative of a high-CPU utilization and security logs indicative of new viruses. Currently, IT personnel have no effective way to determine any causality between these reported inputs.

Existing solutions cannot resolve the deficiencies noted above, as such solutions operate in silos. That is, the creation of machine-generated textual data and reading of such data are performed by different solutions (components), which are not necessarily developed by the same vendors. Furthermore, some existing solutions for digital events-ingestion merely aggregate machine-generated data and provide search capabilities across the aggregated data. Other solutions are limited to processing a specific set of textual data generated by common tools. However, such solutions typically do not cover the entire spectrum of machines installed in an organization and are not adapted to cover the entire set of logs, events, and other data generated by the machines. Therefore, meaningful and important information may not be detected or otherwise analyzed by such solutions.

Existing solutions fail to detect a root cause of a malfunction and, therefore, cannot determine appropriate recommendations for addressing root causes. A malfunction can be a system error or failure, an application error, and the like. This deficiency is largely due to at least the following challenges: the need to query multiple data-sources storing data in different structures at the same time; the structure of machine-generated data not being standardized; the data being formatted with the intention that the data is to be ingested by a human rather than a computer; the machine-generated data including a mixture of the original events, wrapped with unrelated additional information (e.g., Syslog transport headers added by relay servers); and the same data being serialized in several formats (e.g. JSON, XML).

Moreover, some solutions utilize manually provided descriptions of incidents in an attempt to better categorize incidents and, consequently, mitigating actions. However, these descriptions are frequently inaccurate, particularly when users confuse such descriptions and recommended mitigation actions with feedback. This leads to misclassification of incidences and, therefore, corresponding recommendations. Further, different users may provide variations on the same descriptions, which may result in descriptions that are essentially the same being applied differently. Thus, any relationships between incidences and descriptions thereof ultimately rely on manual inputs and, thus, are often inaccurate.

As a result of the deficiencies of existing solutions, machine-generated textual data is often analyzed by humans. Of course, any manual analysis is prolonged, requires human resources, and affects the overall performance of the enterprise. A major drawback of this approach is that the amount of data that can be processed by users such as IT personnel is limited by restraints on human resources. Due to the size, variety, retention, and dynamic nature of machine-generated data that continues to grow, a manual approach for solving the above-noted tasks is inefficient.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include a method for providing an enriched root cause of an incident using machine-generated textual data. The method comprises: extracting, from a dataset including machine-generated textual data for a monitored environment, a plurality of features related to a root cause of an incident in the monitored environment; generating a suitability score for each of a plurality of insights with respect to the incident based on the extracted features and a suitability model, wherein the suitability model is created based on a training set including a plurality of training inputs and a plurality of training outputs, wherein each training output corresponds to at least one of the plurality of training inputs; and selecting at least one suitable insight based on the generated suitability scores.

Some embodiments disclosed herein also include a non-transitory computer readable medium having stored thereon instructions for causing a processing circuitry to execute a process for providing an enriched root cause of an incident using machine-generated textual data, the process comprising extracting, from a dataset including machine-generated textual data for a monitored environment, a plurality of features related to a root cause of an incident in the monitored environment; generating a suitability score for each of a plurality of insights with respect to the incident based on the extracted features and a suitability model, wherein the suitability model is created based on a training set including a plurality of training inputs and a plurality of training outputs, wherein each training output corresponds to at least one of the plurality of training inputs; and selecting at least one suitable insight based on the generated suitability scores.

Some embodiments disclosed herein include a system for providing an enriched root cause of an incident using machine-generated textual data. The system comprises a processing circuitry; and a memory coupled to the processing circuitry, wherein the memory contains instructions that, when executed by the processing circuitry, configure the system to: extract, from a dataset including machine-generated textual data for a monitored environment, a plurality of features related to a root cause of an incident in the monitored environment; generate a suitability score for each of a plurality of insights with respect to the incident based on the extracted features and a suitability model, wherein the suitability model is created based on a training set including a plurality of training inputs and a plurality of training outputs, wherein each training output corresponds to at least one of the plurality of training inputs; and select at least one suitable insight based on the generated suitability scores.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Some embodiments disclosed herein include a method and system for providing enriched root causes based on machine-generated data. Incidences may include failures, malfunctions, and the like of any resource in a monitored environment. A suitable insight is selected for an incident based on a suitability score output by a suitability model using incident parameters of the incident and insight parameters of a plurality of insights as inputs. The suitability model is created using training inputs including training insight parameters, training incident parameters, and training matches between insights and corresponding incidences. In some implementations, the insight with the highest suitability score may be selected for the incident. Each insight is a potential description of the incident, and may further include or be associated with one or more recommendations for fixing or mitigating the incident.

As discussed in more detail herein, a root cause analysis may be performed by aggregating and correlating potential incidence patterns. In various disclosed embodiments, root causes determined via the root cause analysis are enriched with descriptive information using machine learning as described herein. In an embodiment, the machine-generated textual data is collected from one or more data sources. The collected data is reconstructed and classified into different statistical metrics. The statistical metrics may include, for example, a gauge, a meter, and a histogram.

Figure 1:
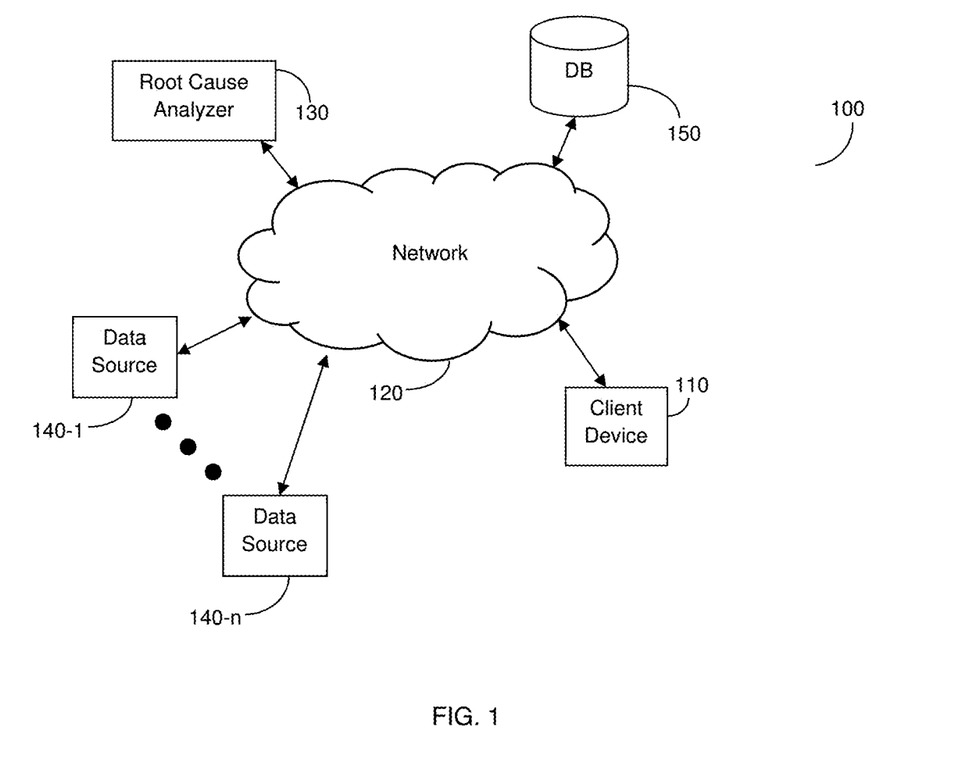
FIG. 1 is a network diagram utilized to describe the various disclosed embodiments.

FIG. 1 shows an example network diagram 100 utilized to describe the various disclosed embodiments. The network diagram 100 includes a client device 110, a network 120, a root cause analyzer 130, and a plurality of data sources 140-1 through 140-n (hereinafter referred to individually as a data source 140 and collectively as data sources 140, merely for simplicity purposes). In some embodiments, the network diagram 100 further includes a database 150 communicatively connected to the network 120 and utilized to store machine-generated textual data, events processed based on machine-generated textual data, and the classification results.

The client device 110 may be operated by a user (e.g., a system administrator) to control the operation of the root cause analyzer 130, view alerts, detected incidences, and so on. The network 120 may be, but is not limited to, a local area network (LAN), a wide area network (WAN), the Internet, a wired network, a wireless network, similar networks, and the like, as well as any combination thereof.

Each of the data sources 140 generates machine-generated textual data. The data sources 140 may be different machines, systems, or software tools operable in an organization and configured to monitor, control, and report on issues related to, for example, computing infrastructure of an organization. Examples for the data sources 140 include any IT-based device, such as routers, network appliances, application servers, database servers, sensors, and the like. In general, any virtual or physical computing resource adapted to generate textual data can serve as a data source 140.

The machine-generated textual data generated by the data sources 140 may include, for example, application logs, configuration files, messages, spreadsheets, events, alerts, sensory signals, audit records, and so on. It should be noted that the data sources 140 are different from each other and, thus, the data provided by each source may be of a different format, structure, or both. Furthermore, some of the data sources 140 may output structured data while others may output unstructured data. The machine-generated textual data provided by the data sources 140 may be standardized or not-standardized.

The machine-generated textual data may be encapsulated in CSV files, JSON files, XML files, plain text files, and so on. Such files can be pulled by the root cause analyzer 130 (from the sources 140), pushed to the root cause analyzer 130, uploaded to the root cause analyzer 130, received at the root cause analyzer 130 through other methods or channels, or a combination thereof. Typically, JSON and XML files are streamed in real-time, while CVS files are uploaded in batches.

In an embodiment, the root cause analyzer 130 may be configured to detect the root cause of incidences. To this end, the root cause analyzer 130 is configured to classify the received machine-generated textual data into a set of statistical metrics. Types of the statistical metrics include, but are not limited to, a histogram, a meter, a gauge, and the like. For example, CPU utilization and page-views may be classified as gauge metrics, purchases may be classified as a histogram metric, and message-clusters and hostnames may be classified as meter metrics. The root cause analyzer 130 may also be configured to output metadata associated with each event in the machine-generated textual data and a schema that can be used to structure the event. The schema allows for performance of various operations on events, such as querying, filtering, manipulating, calculating statistical attributes, or otherwise handling the event or parts of the event.

In an embodiment, the root cause analyzer 130 may be configured to output a rich root cause analysis report indicating information related to identification of the suitable insights for an incident and any recommendations for addressing the incident based on the suitable insights.

The root cause analyzer 130 is further configured to process the various portions of an event to identify contextual tokens. Typically, contextual tokens are identified in messages included in the event. A message includes free-text that cannot be categorized as a property and has a length (e.g., number of characters) above a predefined threshold.

The metric utilized to classify events is determined for clusters of events, tokens, key-value pairs, and properties. In an embodiment, the determination of which metric type to associate with each such element is based on the element's type, context, or a combination thereof. That is, for each identified element (e.g., elements such as clusters, tokens, key-value pairs, and properties), it is determined whether the element's value can be statistically measured as any or all of a value distribution (histogram), an appearance rate (meter), or a value range (gauge). The context of an element can be utilized to determine its statistical value distribution. A metric is a statistical value distribution.

An example classification process is described in more detail in the above-referenced co-pending U.S. patent application Ser. No. 15/228,272 (hereinafter the '272 Application), assigned to the common assignee, which is hereby incorporated herein by reference.

In an embodiment, the root cause analyzer 130 is configured to recognize incidence patterns by processing the statistical metrics. The root cause analyzer 130 may be further configured to apply past behavior of each incidence pattern to predict its future behavior. The recognized incidence patterns are processed to determine a root cause of an incidence. A set of "meaningful" incidence patterns from the recognized incidence patterns is processed. To this end, the root cause analyzer 130 is configured to determine which of the recognized incidence patterns are meaningful. The meaningful patterns may be determined based on the amplitude of a pattern, a frequency of a pattern, a similarity of a pattern to previously detected patterns, a number of same or similar recognized patterns, or any combination thereof. The root cause of an incidence may be further determined by aggregating and correlating at least two recognized incidence patterns.

The correlation may be time-proximity based, based on a certain order (e.g., time, severity, or both), based on tracing certain entities in at least one incidence pattern of a detected incidence, and the like.

Determining root causes of incidences is described further in the above-referenced U.S. patent application Ser. No. 15/499,060 assigned to the common assignee, the contents of which are hereby incorporated by reference.

It should be appreciated that as incidence patterns are generated by difference applications and/or sources, the aforementioned incidence pattern analysis allows for detection of a cause of an incidence across applications. For example, a cause for a failure of an application may be a firewall that blocked a specific IP address.

The detection of a root cause of a single incidence pattern may be detected. That is, the root cause is determined without correlation of two or more incidence patterns. In this embodiment, upon detection of an incidence, machine-generated textual data associated with the respective incidence pattern are gathered. Machine-generated textual data received during a past predefined time window may be gathered. For example, all application logs generated in the last hour since the detection of the incidence are gathered. The gathered machine-generated textual data may be classified or unclassified.

The gathered machine-generated textual data is analyzed to detect one or more entities that may cause the incidence. The values of one, some, or all of the entities are extracted from the gathered textual data and compared to their respective historic values. A historic value represents at least normal behavior of an entity. Any entity that deviates from its respective value may indicate the root cause of the incidence. The entities to be analyzed may be predetermined.

As an example, a failure in a number of servers installed in a rack cabinet is detected at 22:27. The sensory signals including readings of the temperature in the rack cabinet since 21:27 are gathered and compared to their respective historic values. Higher readings in the temperature since 21:27 would indicate that the root cause is a rack's fan failure. Returning to FIG. 1, in an embodiment, the root cause analyzer 130 is configured to generate an alert indicating the determined root cause. In another embodiment, the root cause analyzer 130 is configured to group together alerts which have a common cause into one incident. In yet another embodiment, the root cause analyzer 130 is further configured to report any alert remaining after the root cause analysis with additional information related to the associated incidence or incidences. That is, an alert would indicate the detected root cause and would be reported with the associated incidence(s). This allows the user to drill down and better understand the problem potential solutions.

It should be noted that all incidence patterns are generated from machine-generated textual data which are automatically processed and classified into statistical metrics. For example, an error log reported by a load balancer (e.g., the load balancer 510-1, FIG. 5) may be: "Error(s) found in configuration file: /etc/haproxy/haproxy.cfg" and an error reported by an application server (e.g., one of the application servers 520, FIG. 5) may be: "Connection pool is full, discarding connection: [ConnectionName], path name: [PathName]". Thus, the root cause analyzer 130 is configured to determine the root cause of any incidence by merely processing input machine-generated textual data.

In an embodiment, based on the determined root causes of incidences, the root cause analyzer is configured to generate an enriched root cause for each incident. The enriched root cause for an incident includes a descriptive insight of the incident. The descriptive insight may be a textual insight of the incident, and may include or be associated with one or more recommendations. The recommendations may include, for example, actions to be taken to fix or mitigate the incident. The insight may be a most suitable insight selected from among previously created insights that may be, for example, uploaded by users, generated by crawling the web for content, previously applied and tested, or a combination thereof.

In an embodiment, the root cause analyzer 130 is configured to select the suitable insight using machine learning. To this end, the root cause analyzer 130 may be configured to train a suitability model using a training set containing features including at least parameters related to insights, parameters related to incidences, and matches between insights and incidences. The machine learning model outputs a suitability score for each insight with respect to an incident based on inputs including insight parameters of each insight, incident parameters of the incident.

In some implementations, the machine learning model may be further trained based on user feedback. The user feedback may include, but is not limited to, voting scores (e.g., user provided scores, percentages of users that found the insight helpful, etc.), textual feedback (e.g., "unclear," "unhelpful," "unrelated," "trivial," "wrong," "duplicate," "helpful," "other," etc.), or both.

In some implementations, the machine learning model may be further trained continuously based on self-tuning. The self-tuning may be based on, but not limited to, frequency of each insight, numbers of matching incidences for each insight, and the like. For example, an insight that comes up above a threshold frequency may be penalized (i.e., by resulting in a lower suitability score), while an insight that matched a number of distinct incidences below a threshold matching number may be encouraged (i.e., by resulting in a higher suitability score).

Each suitability score indicates a degree of matching between the incident and one of the insights. In an embodiment, the insight with the highest score may be selected. In another embodiment, multiple insights may be selected. The selected insights may be provided by, for example, displaying them to a user. Multiple selected insights may be displayed with respect to their scores (e.g., from highest to lowest score).

The insight parameters may include, but are not limited to, age (i.e., an amount of time since the insight was created, added, updated, etc.), number of relevant incidences for each insight, a number of distinct previously matching incidences for each insight, a frequency of each insight, a user reputation of the user who added each insight (for example, a user who is an expert in the field may be assigned a higher user reputation value than a novice), one or more characteristics of language in the insight (e.g., presence or absence of links or referrals), a source of each insight (e.g., an official document, a user-added insight repository, a web source found using web crawling, etc.), a combination thereof, and the like. With respect to age, recently added insights may correspond to higher suitability scores. With respect to numbers of relevant or previously matching incidences, insights having more relevant or previously matching incidences may correspond to lower scores.

The incident parameters may include, but are not limited to, identified root causes of incidences, times of incidences, locations of incidences (e.g., locations within a system or network), systems or components (e.g., hardware components or software sub-systems) affected by incidences, a type of incidence (e.g., starting, stopping, spiking, dropping, etc.), and the like.

Additional insights may be added over time such that, in an embodiment, the root cause analyzer 130 may be configured to update the machine learning model based on newly added insights. Added insights may further include existing insights that have been updated, for example, an insight that has been edited by a user. Further, the machine learning model may be updated based on actions taken by users in response to incidences. Specifically, weights applied to each input feature may be updated based on actions such as, but not limited to, resolving, dismissing, and the like. For example, insights corresponding to dismissed incidents may correspond to lower suitability scores than other insights. The machine learning model may be updated in real-time in response to addition of insights, updating of insights, or actions taken by users, or may be updated continuously, for example, at predetermined time intervals.

It should be understood that the embodiments disclosed herein are not limited to the specific architecture illustrated in FIG. 1, and other architectures may be equally used without departing from the scope of the disclosed embodiments. Specifically, the root cause analyzer 130 may reside in a cloud computing platform, a datacenter, and the like. Moreover, in an embodiment, there may be a plurality of classification servers operating as described hereinabove and configured to either have one as a standby, to share the load between them, or to split the functions between them.

Figure 2:
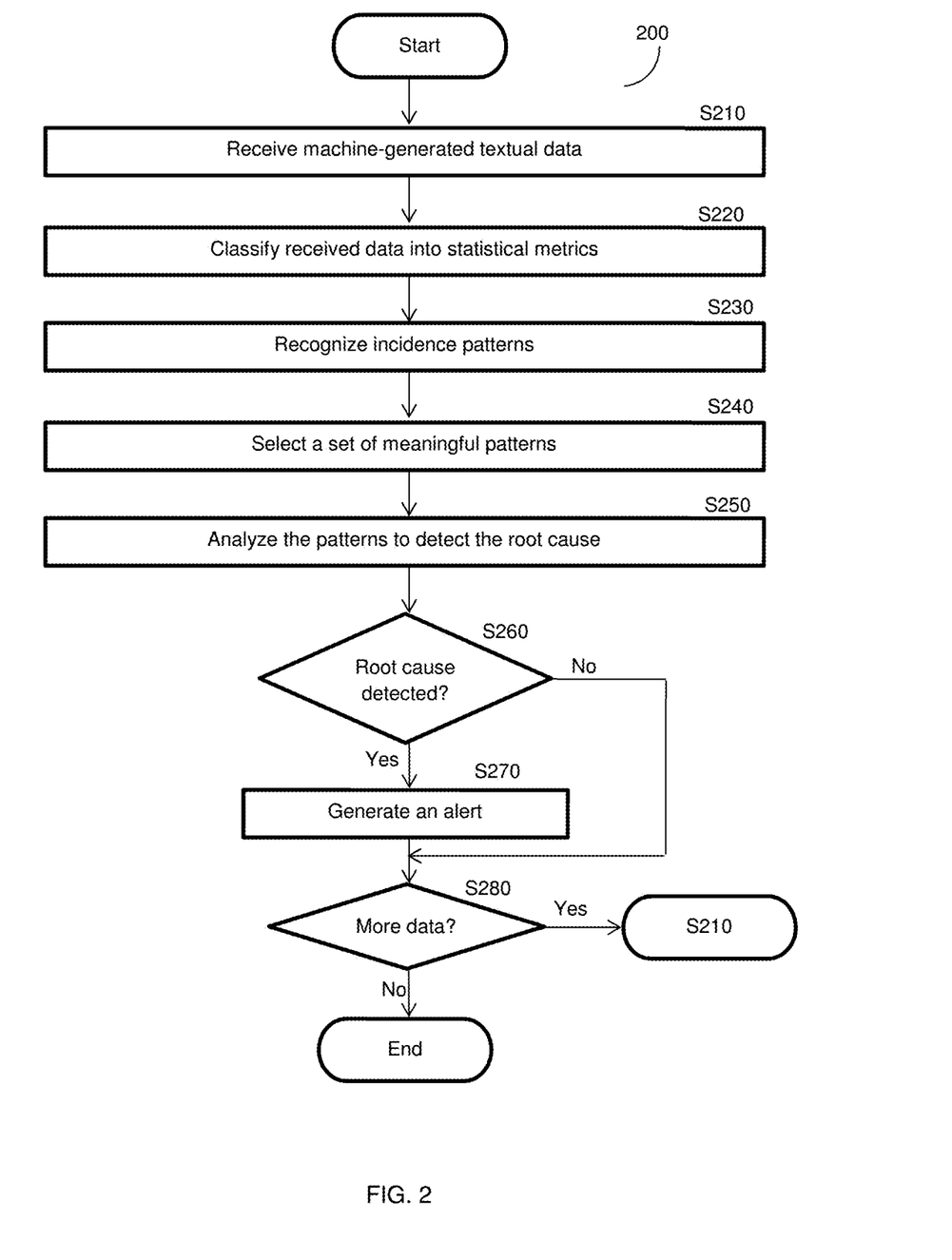
FIG. 2 is a flowchart illustrating a method for root cause analysis of incidence using machine-generated textual data according to an embodiment.

FIG. 2 shows an example flowchart 200 of a method for determining a root cause of an incident based on machine-generated textual data according to an embodiment.

At S210, machine-generated textual data is received from a plurality of data sources. The machine-generated textual data may include, but is not limited to, application logs, configuration files, messages, spreadsheets, alerts, sensory signals, audit records, combinations thereof, and the like.

At S220, the received machine-generated textual data is classified into statistical metrics. As noted above, a statistical metric may include, but is not limited, a gauge, a meter, a histogram, and the like. In an embodiment, the classification process is performed as described in more detail in the above-referenced '272 Application.

At S230, the statistical metrics are processed to recognize incidence patterns. In an embodiment, S230 includes applying a past behavior of each incidence patterns to predict its future behavior. The incidence patterns may include, but are not limited to, new behavior, anomalous behavior, changes in routine operational, ongoing trends, and so on. As noted above, some techniques for recognizing incidence patterns that can be utilized according to the disclosed embodiments are discussed above.

At S240, a set of meaningful incidence patterns are selected or otherwise determined from among the recognized incidence patterns. A meaningful incidence pattern is an incidence pattern containing data (of a statistical metric) that can be utilized to determine a root cause of an observed or unobserved incidence. Such meaningful patterns can be detected by considering the amplitude of a pattern, a frequency of a pattern, a similarity of a pattern to previously detected patterns, a number of detected same or similar patterns, or any combination thereof. For example, only incidence patterns that were previously observed are considered meaningful. In some embodiments, S240 is optional.

At S250, the determined meaningful incidence patterns are analyzed to identify any root cause of an incidence (observed or unobserved). An observed incidence may be reported in an alert, while an unobserved incidence exists in the monitored environment but has not been discovered yet. In an embodiment, the monitored environment is any IT infrastructure and any computing resource included therein. Examples for such resources include network devices, computers, servers, software applications, software services, storage devices, storage networks, and the like. An incidence may be, for example, a failure or malfunction that negatively affects the operation of such a resource.

In an embodiment, the analysis includes correlating the incidence patterns (meaningful or not) using different correlation types. Such a correlation type may include time-proximity correlation, component-based (i.e., correlation of incidence patterns across different components), order-based (i.e., correlation of incidence patterns based on a certain order), or a combination thereof. The root cause is determined based on the correlation type being utilized. The different correlation types are discussed in greater detail below and for the sake of the simplicity of the discussion are not repeated herein.

At S260, it is checked if a root cause of an incidence is determined based on the analysis of the meaningful incidence patterns. If so, execution continues with S270, where an alert is generated and reported; otherwise, execution proceeds with S280. The generated alert indicates at least the determined root cause. In another embodiment, any alert remaining after the root cause analysis with additional information related to the associated incidence or incidences is also reported.

At S280, it is checked if there are additional data logs to be processed; if so, execution returns to S210; otherwise, execution terminates.

Figure 3:
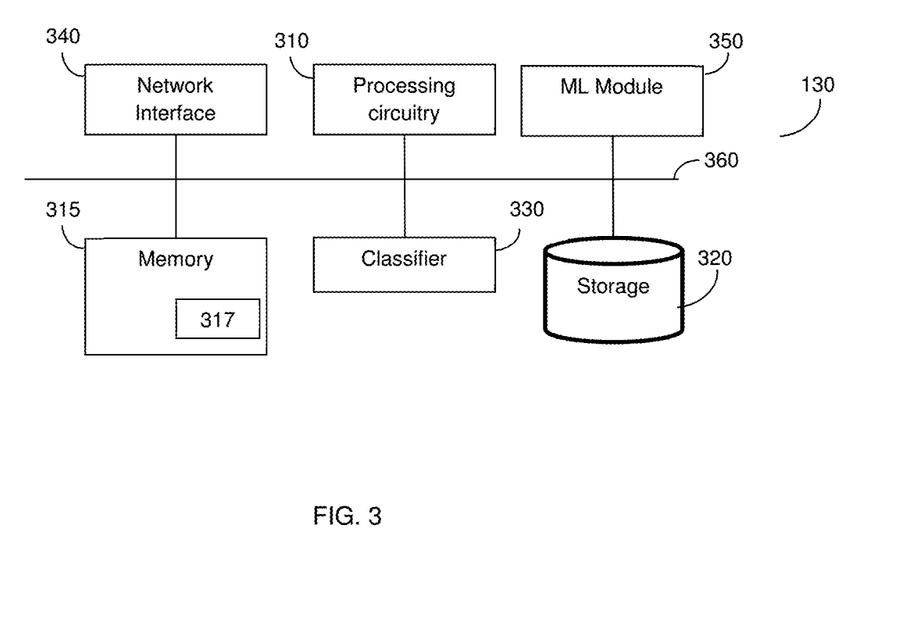
FIG. 3 is a block diagram of a root cause analyzer according to an embodiment.

FIG. 3 shows an example block diagram of the root cause analyzer 130 implemented according to an embodiment. The root cause analyzer 130 includes a processing circuitry 310 coupled to a memory 315, a storage 320, a classifier 330, a network interface 340, and a machine learning (ML) module 350. In an embodiment, the components of the classification root cause analyzer 130 may be communicatively connected via a bus 360.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 315 may be volatile (e.g., RAM, etc.), non-volatile (e.g., ROM, flash memory, etc.), or a combination thereof. In one configuration, computer readable instructions to implement one or more embodiments disclosed herein may be stored in the storage 320.

In another embodiment, the memory 315 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 310 to perform the various processes described herein. Specifically, the instructions, when executed, configure the processing circuitry 310 to determine root cause of incidences based on machine-generated textual data. In a further embodiment, the memory 315 may further include a memory portion 317 including the instructions.

The storage 320 may be magnetic storage, optical storage, and the like, and may be realized, for example, as flash memory or other memory technology, CD-ROM, Digital Versatile Disks (DVDs), or any other medium which can be used to store the desired information. The storage 320 may store the received machine-generated textual data, events, metadata for events, events schema, various elements of each events, and/or the classification results.

The classifier 330 is configured to classify machine-generated textual data into metrics to enable systems to ingest, process, analyze, aggregate, and correlate the data by machines without scale or volume limitations. In an embodiment, processes performed by the classifier 330 may be performed as discussed in greater detail in the above-referenced Ser. No. 15/499,060 Application. The classifier 330 may be realized as, for example, a support vector machine.

The network interface 340 allows the root cause analyzer 130 to communicate with the data sources 140 for the purpose of, for example, receiving machine-generated textual data. The root cause analyzer 130 can be utilized to output the classification results to external systems (not shown) for further processing. In an embodiment, the network interface 340 can allow interface with client devices to view the classification results and/or to configure the root cause analyzer 130.

The machine learning module 350 is at least configured to apply suitability models to application inputs to determine suitability scores for insights with respect to incidences as described herein. The machine learning module 350 may be further configured to train suitability models using training inputs as described herein.

It should be understood that the embodiments described herein are not limited to the specific architecture illustrated in FIG. 3, and that other architectures may be equally used without departing from the scope of the disclosed embodiments.

Figure 4A:
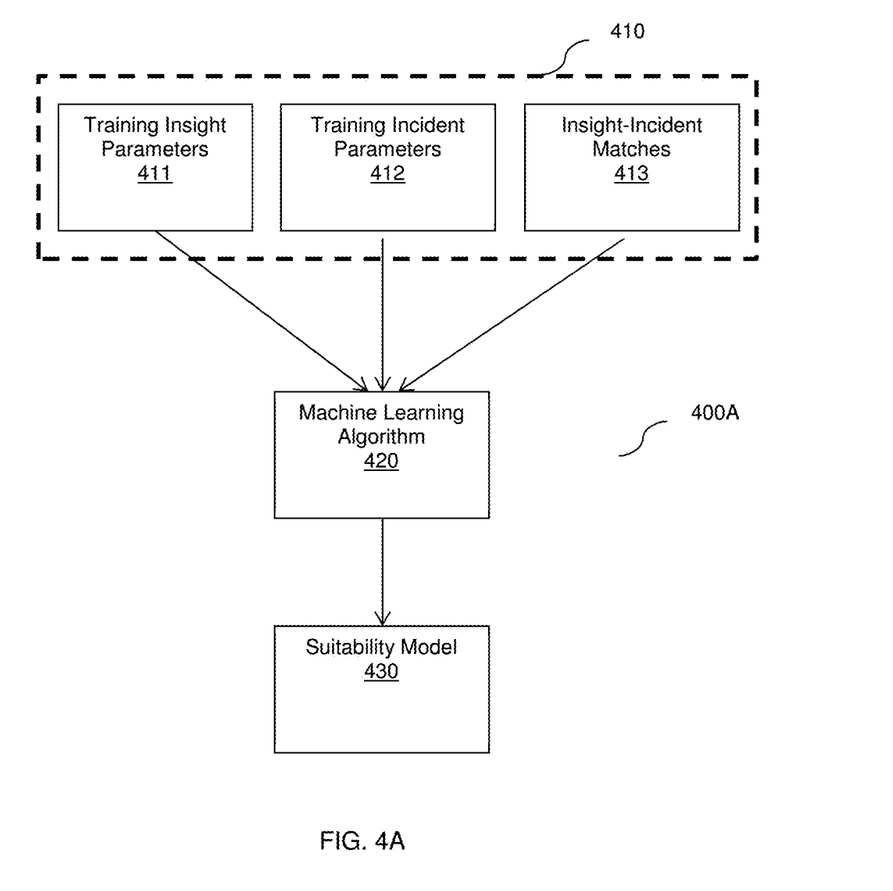
FIGS. 4A and 4B are flow diagrams illustrating a training phase and a test phase, respectively, of a method for providing enriched root cause data based on machine-generated data according to an embodiment.

FIG. 4A is a flow diagram 400A illustrating a training phase for creating a suitability model for incidences according to an embodiment. A labeled training set 410 is fed to a machine learning algorithm 420 to generate a suitability model 430.

The labeled training set 410 includes sequences of training inputs such as training insight parameters 411 as well as training incident parameters 412. The labeled training set 410 also includes training outputs such as training insight-incident matches 413. The labeled training set 410 may be sampled based on, e.g., a predefined sampling scheme; may be gathered over a period of time (i.e., as insights are provided for incidences); may be based on predetermined training data from a common source (e.g., "Apache Webserver logs") or data demonstrating global contexts (e.g., "HTTP 404"); and the like.

In an embodiment, at least some of the data of the training input set 410 may be utilized as features that are input to the machine learning algorithm 420. In a further embodiment, the features may be extracted based on analysis of any of the insight parameters 411 and the incident parameters 412. The features are related to properties of incidences, properties of insights, and matches between incidences and insights. The features may also include parameters related to corrective actions utilized for different incidences, textual or numerical feedback of insights for previous incidences, or both.

Upon feeding the training set 410 to the machine learning algorithm 420, a suitability model 430 may be generated. The suitability model 430 may be utilized to generate suitability scores for insights with respect to incidences.

Figure 4B:
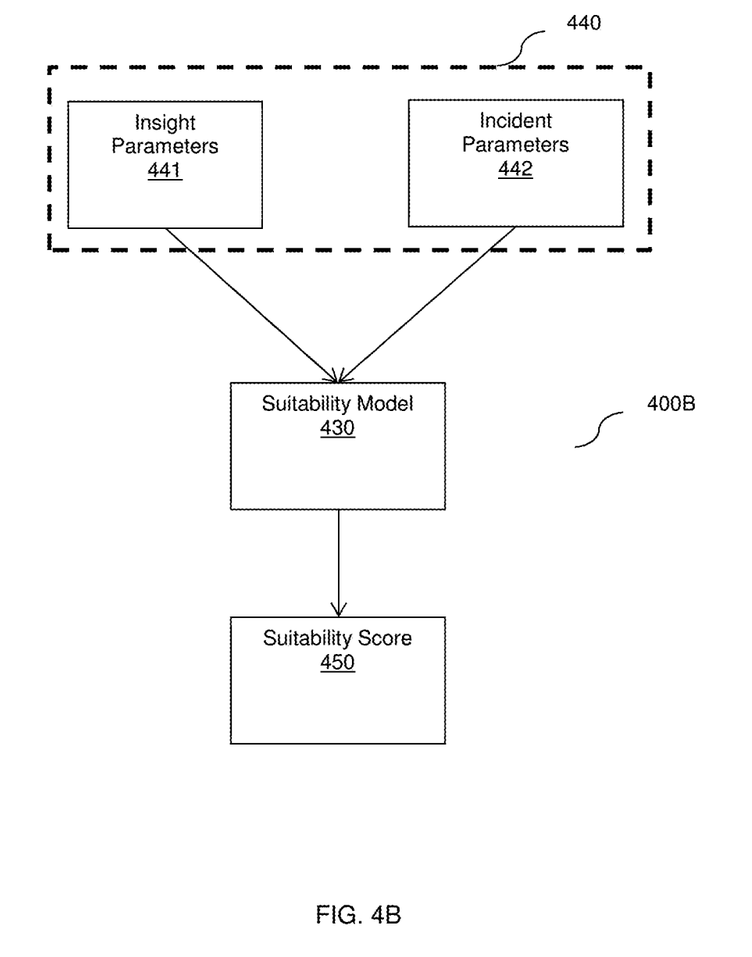

FIG. 4B shows a flow diagram 400B illustrating an application phase of the suitability model 430 according to an embodiment. A suitability score 450 is generated based on an application input set 440 and the suitability model 430.

The application input set 440 may include sequences of applied inputs such as application insight parameters 441 and application incidence parameters 442. The application input set 440 may be received from one or more data sources (e.g., the data sources 140, FIG. 1) in a monitored environment. Each application input of the application input set 440 may have the same input structure as a respective training input of the training input set 410. The suitability score 450 indicates a likelihood that the insight is suitable for the incident, and may be utilized to select a most suitable insight for a given incident.

In an embodiment, at least some of the data of the application input set 440 may be utilized as features that are input to the suitability model 430. Alternatively or collectively, any data of the application input set 440 may be analyzed, and the features may include results of the analysis. For example, the analysis may include identification of key words in textual data.

Figure 5:
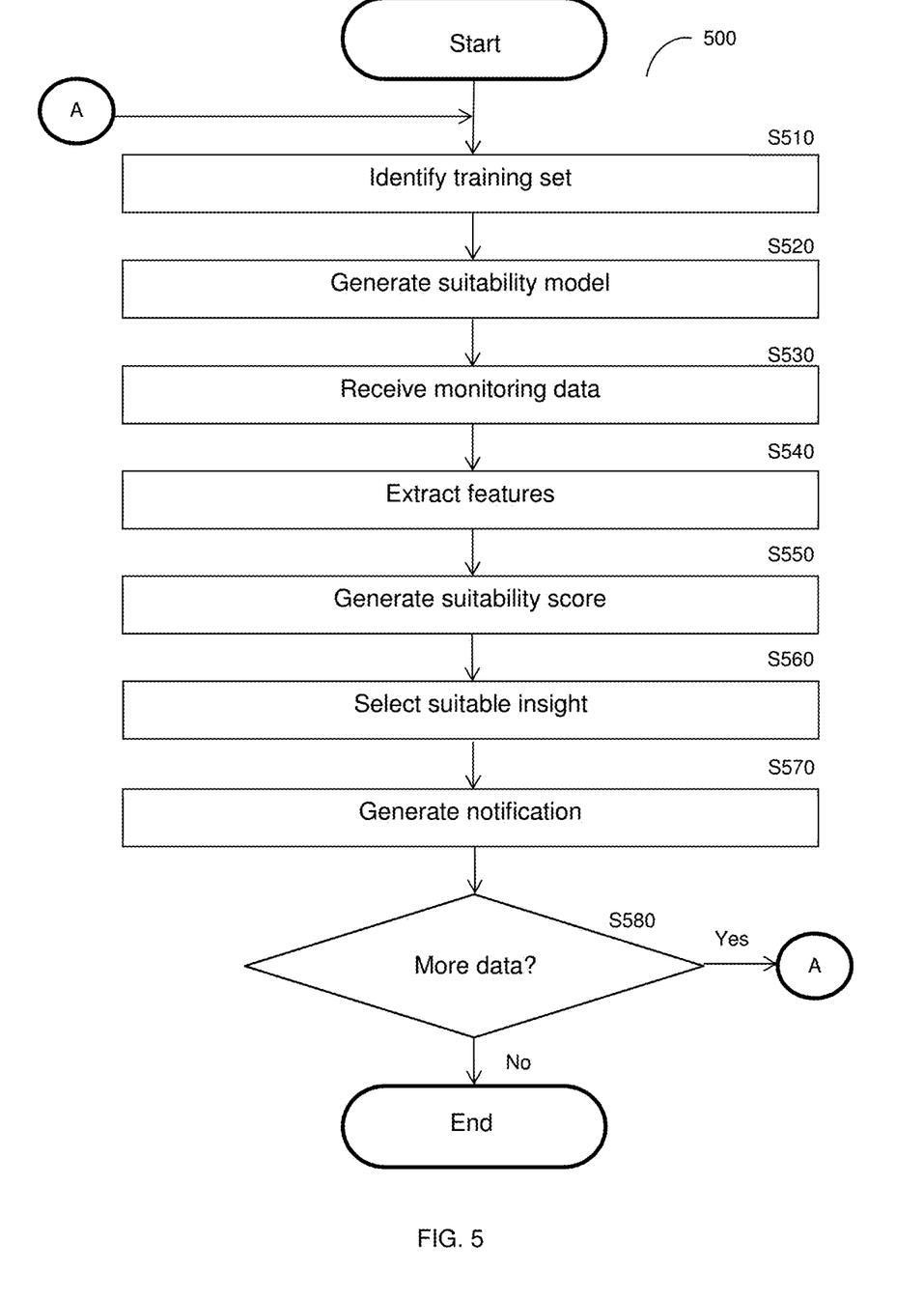
FIG. 5 is a flowchart illustrating a method for providing enriched root cause data based on machine-generated data according to an embodiment.

FIG. 5 is an example flowchart 500 illustrating a method for providing enriched root causes according to an embodiment. In an embodiment, the method is performed by the root cause analyzer 130.

At S510, a training data set is identified with respect to an incident that occurred in a monitored area. The identified input set may be received from one or more data sources (e.g., the data sources 140, FIG. 1) deployed in proximity to a monitored environment. A data source may be deployed in proximity to the monitored environment if it is physically located within the monitored environment or near (e.g., within a predetermined distance) of the monitored environment, or if the data source is communicatively connected to a machine configured to generate textual data located in or near the monitored environment.

The training set may include training inputs such as, but not limited to, insight parameters and incident parameters. The training set may further include training outputs such as, but not limited to, matches between incidents and respective matching insights. The insight parameters may include, for example, age, numbers of relevant incidences, numbers of matching incidences, and the like. The incident parameters may include, but are not limited to, root causes for incidences, times, locations, systems or components affected, and the like.

In an embodiment, the training set may be retrieved or generated and labeled. In a further embodiment, the training inputs may be labeled automatically based on, e.g., analysis of the training inputs. For example, the labeling may be based on processing of a sequence of machine-generated textual data. In another embodiment, the training inputs may be labeled manually, i.e., based on a user input regarding the plant featured therein.

At S520, a suitability model is generated based on the training set. In an embodiment, the suitability model may be generated based on convolutional neural networks. The steps S510 and S520, collectively, may be utilized to build a classifier as described further herein above with respect to the classifier 330 of FIG. 3.

In an embodiment, S520 may further include testing, validation, or both, of the suitability model. The testing and validation may be utilized to, e.g., refine, validate, or otherwise provide more accurate suitability scores.

At S530, monitoring data is received or retrieved. The monitoring data may include, but is not limited to, machine-generated textual data, textual descriptions of insights, environmental parameters (e.g., time of addition of insights, times or relative locations of incidents), identifiers of systems and components (e.g., systems and components affected by incidents), and the like. The textual descriptions of the insights may be provided by users, determined automatically by crawling for textual content, and the like.

In an embodiment, S530 may include identifying root causes of incidences based on machine-generated textual data, for example as described herein above with respect to FIG. 2. The identified root causes are included with the monitoring data.

At S540, features to be utilized as inputs to the suitability model are extracted based on the monitoring data. The features are related to insights and incidences, and may include insight parameters, incident parameters, both, and the like.

In an embodiment, S540 may include analyzing the monitoring data, applying at least one transformation to the monitoring data, or both. In a further embodiment, S540 may include identifying root causes of incidences based on machine-generated textual data, for example as described herein above with respect to FIG. 2.

At S550, suitability scores are generated. In an embodiment, S550 includes applying the suitability model to the determined features. A suitability score may be generated for each insight with respect to an incident. In a further embodiment, S550 may also include selecting the suitability model based on the determined features. For example, different suitability models may be utilized for different incidences. The selection of the suitability model may be performed by, for example, a classifier (e.g., the classifier 330, FIG. 3).

At S560, a suitable insight is selected for an incident based on the generated suitability scores. In an example implementation, the insight with the highest score with respect to the incident may be selected. In some implementations, multiple potentially suitable insights may be selected. The multiple potentially suitable insights may be displayed or organized with respect to their relative suitability scores.

It should be noted that the selected suitable insight does not need to be distinctly applicable to one incident. In some implementations, a particular insight may be suitable for multiple different incidences. Accordingly, the suitability selection may result in many-to-many suitability among incidences and suitable insights such that multiple insights may be suitable for each incident, and each suitable insight may be suitable for multiple incidences.

As a non-limiting example, an insight created at the resolution of a particular incident may be specific to that incident such that the insight is only selected as a suitable insight for similar incidences, while other insights are selected to be suitable based on the presence of particular terms or traits (e.g., the term "HTTP 404") and, therefore, may match multiple different incidences matching these terms or traits.

At optional S570, a notification may be generated. The notification may indicate the suitable insights, the suitability scores, or both. Each insight may further include or be associated with one or more recommendations. To this end, the notification may further include the recommendations of the suitable insight. The notification may be sent to, e.g., a mobile device of an owner of the monitored area, to a website accessible to the owner of the target area, and the like.

At S580, it is determined if additional monitoring data has been received and, if so, execution continues with S530; otherwise, execution terminates. In an embodiment, additional inputs may be received continuously or periodically, thereby allowing for monitoring of the suitability based on, for example, newly added insights and newly identified root causes of incidences.

It should be noted that, in some embodiments, the steps S510 and S520 may be performed offline, at a remote time from the other steps of the method of FIG. 5, or both. In an embodiment, the training input labeling and approximation of predictive functions may be performed only once initially, and may be repeated only as desired to determine, e.g., newly added insights, newly detected incidences, and so on. Further, in an embodiment, the prediction model may be further subjected to testing, validation, or both, thereby allowing for improvement of the prediction model, confirmation of the accuracy of the prediction model, or both.

It should be noted that the method of FIG. 5 may be iteratively repeated, thereby allowing for continuous monitoring and updating of the suitability model. Such continuous monitoring and updating allows for improved selection of insights for incidents and, specifically, for adapting insight selection based on newly added insights, newly determined root causes, and the like.

Figure 6:
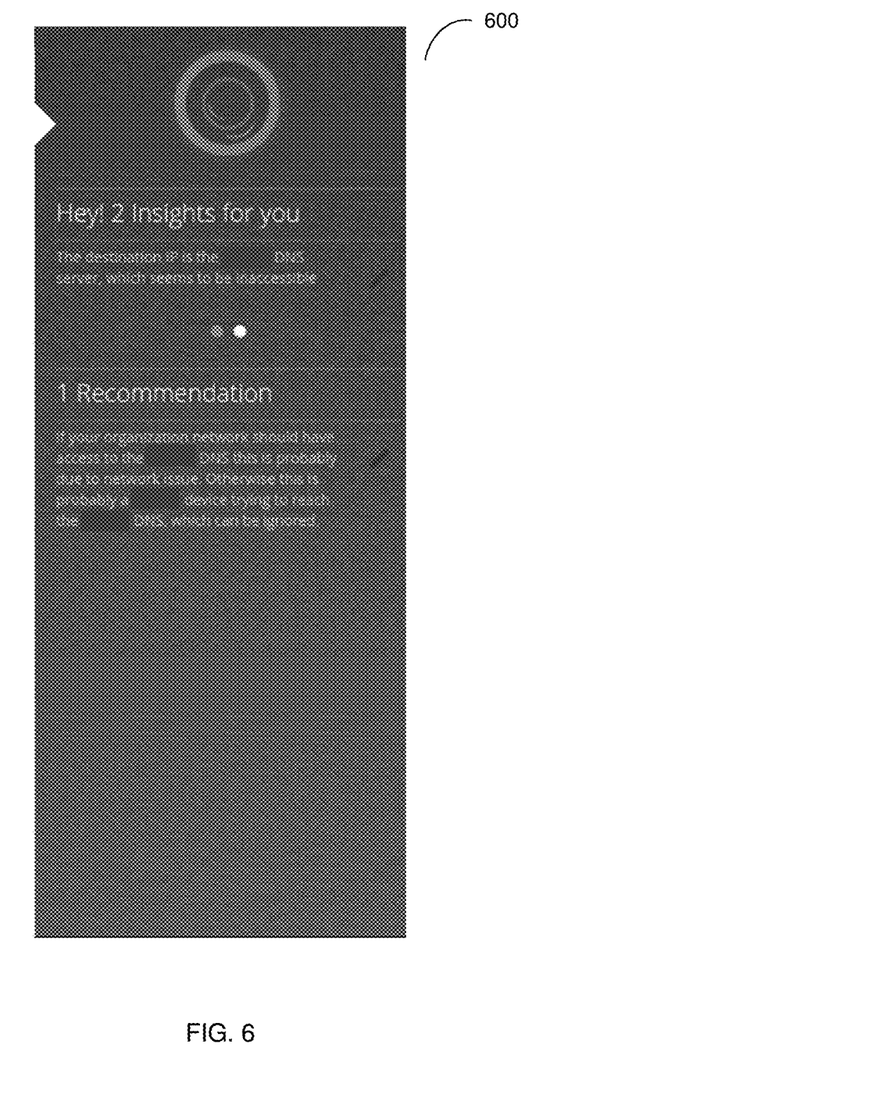
FIG. 6 is an example screenshot of an insight and recommendation.

FIG. 6 is an example screenshot 600 illustrating a notification providing a potentially suitable insight and a recommendation. In the example screenshot 600, one of the potentially suitable insights is a textual description stating "The destination IP is the Google DNS server, which seems to be inaccessible." The recommendation is a recommendation associated with the inaccessible DNS server indicates that the incident is either due to a network issue or can be ignored.

Figure 7:
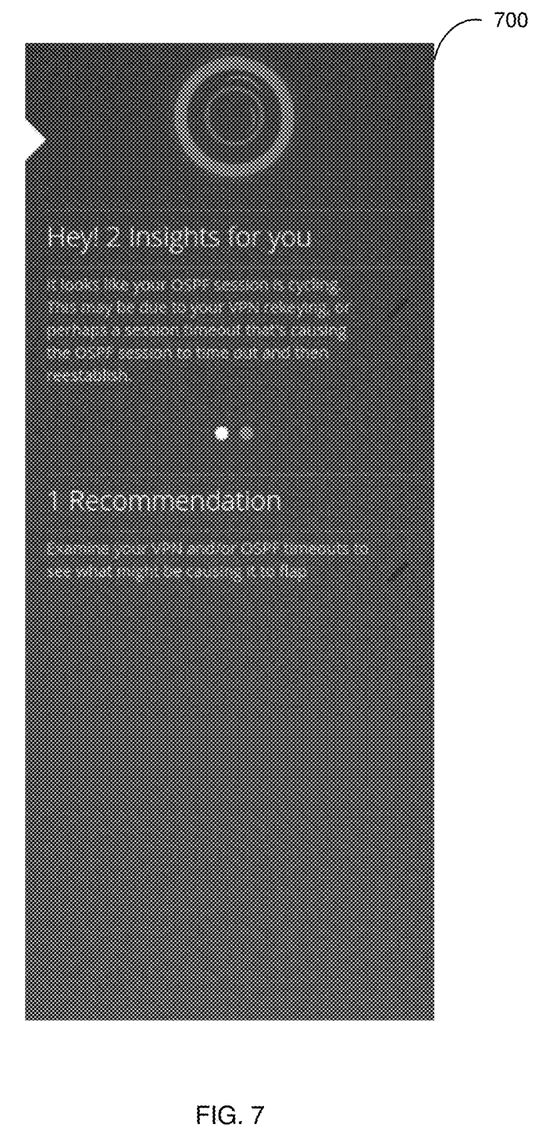
FIG. 7 is an example screenshot of an insight and recommendation.

FIG. 7 is an example screenshot 700 illustrating a notification providing a potentially suitable insight and a recommendation. In the example screenshot 700, one of the potentially suitable insights is a textual description stating "It looks like your OSPF session is cycling. This may be due to your VPN rekeying, or perhaps a session timeout that's causing the OSPF session to time out and then reestablish." The recommendation is a recommendation associated with the cycling OSPF session that suggests examining the VPN and/or OSPF timeouts.

It should further be noted that, as described herein, the term "machine learning techniques" may be used to refer to methods that can provide computers with the ability to learn without being explicitly programmed. To this end, example machine learning techniques utilized according to the disclosed embodiments may include, but are not limited to, fuzzy logic, prioritization, scoring, and pattern detection. In particular, the present disclosure relates to supervised learning approaches in which inputs are linked to outputs via a training data set. It should be noted that unsupervised learning approaches may be utilized without departing from the scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A computer-implemented method for providing an enriched root cause data of an incident using machine-generated textual data, comprising:
   extracting from a dataset including machine-generated textual data for a monitored environment, a plurality of features related to a root cause of an incident in the monitored environment;
   generating, by a computer, a suitability score for each of a plurality of insights with respect to the incident based on the extracted features and a suitability model, wherein the suitability model is created based on a training set including a plurality of training inputs and a plurality of training outputs, wherein each training output corresponds to at least one of the plurality of training inputs, and wherein the training inputs include a plurality of insight parameters, a plurality of incident parameters, and a plurality of matches between a plurality of training incidences and a plurality of corresponding training insights; and
   selecting, by the computer, at least one suitable insight based on the generated suitability scores.

2. The method of claim 1, wherein the insight parameters include at least one of: an age of each insight, a number of relevant incidences for each insight, a frequency of each insight, a user representation associated with each insight, a source of each insight, and a number of previously matched incidences for each insight.

3. The method of claim 1, wherein the training outputs include a match between the incident and each of the plurality of insights.

4. The method of claim 1, wherein each selected insight is a potential textual description of the incident.

5. The method of claim 1, further comprising:
   generating an enriched root cause of the incident based on the root cause and the selected at least one suitable insight.

6. The method of claim 1, further comprising:
   receiving machine-generated textual data from at least one data source, wherein the machine-generated textual data is received from at least one machine in the monitored environment;
   classifying the received machine-generated textual data into at least one statistical metric;
   processing the at least one statistical metric to recognize a plurality of incidence patterns; and
   correlating the plurality of incidence patterns to identify the root cause of the incident, wherein the incident occurred in the monitored environment.

7. The method of claim 6, wherein classifying the machine-generated textual data into statistical metrics further comprises:
   grouping the machine-generated textual data into a plurality of events;
   processing each event to determine a plurality of elements embedded therein;
   determining a type of each of the plurality of elements; and
   determining a statistical metric for each element based on at least the type of the element.

8. The method of claim 1, wherein the machine-generated textual data includes at least one of: application logs, configuration files, alerts, sensory signals, audit records, and a combination thereof.

9. A non-transitory computer readable medium having stored thereon instructions for causing a processing circuitry to execute a process for providing an enriched root cause of an incident using machine-generated textual data, the process comprising:
   extracting, from a dataset including machine-generated textual data for a monitored environment, a plurality of features related to a root cause of an incident in the monitored environment;
   generating, by a computer, a suitability score for each of a plurality of insights with respect to the incident based on the extracted features and a suitability model, wherein the suitability model is created based on a training set including a plurality of training inputs and a plurality of training outputs, wherein each training output corresponds to at least one of the plurality of training inputs, and wherein the training inputs include a plurality of insight parameters, a plurality of incident parameters, and a plurality of matches between a plurality of training incidences and a plurality of corresponding training insights; and
   selecting at least one suitable insight based on the generated suitability scores.

10. A system for providing an enriched root cause of an incident using machine-generated textual data, comprising:
    a processing circuitry; and
    a memory communicatively connected to the processing circuitry, wherein the memory contains instructions that, when executed by the processing circuitry, configure the system to:

extract, from a dataset including machine-generated textual data for a monitored environment, a plurality of features related to a root cause of an incident in the monitored environment;

generate a suitability score for each of a plurality of insights with respect to the incident based on the extracted features and a suitability model, wherein the suitability model is created based on a training set including a plurality of training inputs and a plurality of training outputs, wherein each training output corresponds to at least one of the plurality of training inputs, and wherein the training inputs include a plurality of insight parameters, a plurality of incident parameters, and a plurality of matches between a plurality of training incidences and a plurality of corresponding training insights; and select at least one suitable insight based on the generated suitability scores.

11. The system of claim 10 wherein the insight parameters include at least one of: an age of each insight, a number of relevant incidences for each insight, a frequency of each insight, a user representation associated with each insight, a source of each insight, and a number of previously matched incidences for each insight.

12. The system of claim 10, wherein the training outputs include a match between the incident and each of the plurality of insights.

13. The system of claim 10, wherein each selected insight is a potential textual description of the incident.

14. The system of claim 10, wherein the system is further configured to:

generate an enriched root cause of the incident based on the root cause and the selected at least one suitable insight.

15. The system of claim 10, wherein the system is further configured to:

receive machine-generated textual data from at least one data source, wherein the machine-generated textual data is received from at least one machine in the monitored environment;

classify the received machine-generated textual data into at least one statistical metric;

process the at least one statistical metric to recognize a plurality of incidence patterns; and correlate the plurality of incidence patterns to identify the root cause of the incident, wherein the incident occurred in the monitored environment.

16. The system of claim 15, wherein the system is further configured to:

group the machine-generated textual data into a plurality of events;

process each event to determine a plurality of elements embedded therein;

determine a type of each of the plurality of elements; and determine a statistical metric for each element based on at least the type of the element.

17. The system of claim 10, wherein the machine-generated textual data includes at least one of: application logs, configuration files, alerts, sensory signals, audit records, and a combination thereof.

* * * * *